(12) United States Patent
Nakano (10) Patent No.: US 8,491,296 B2
(45) Date of Patent: Jul. 23, 2013

(54) LIP DRIVE PART FOR T-DIE

(75) Inventor: Katsuyuki Nakano, Yokohama (JP)

(73) Assignee: Sumitomo Heavy Industries Modern, Ltd., Yokohama-Shi, Kanagawa (JP)

( * ) Notice: Subject to any disclaimer, the term of this patent is extended or adjusted under 35 U.S.C. 154(b) by 0 days.

(21) Appl. No.: 13/269,144

(22) Filed: Oct. 7, 2011

(65) Prior Publication Data

US 2012/0024226 A1    Feb. 2, 2012

Related U.S. Application Data

(63) Continuation of application No. PCT/JP2010/054020, filed on Mar. 10, 2010.

(30) Foreign Application Priority Data

Apr. 10, 2009    (JP) .................................. 2009-096208

(51) Int. Cl.
   *B29C 47/16*    (2006.01)

(52) U.S. Cl.
   USPC .......................................... 425/381; 425/466

(58) Field of Classification Search
   USPC ................. 425/141, 133.5, 381, 466
   See application file for complete search history.

(56) References Cited

U.S. PATENT DOCUMENTS

| | | | | |
|---|---|---|---|---|
| 3,096,543 A | * | 7/1963 | Konopacke et al. | 425/466 |
| 3,102,302 A | * | 9/1963 | Moore | 425/466 |
| 4,990,078 A | | 2/1991 | Tomita | |
| 5,056,030 A | | 10/1991 | Tomita | |

FOREIGN PATENT DOCUMENTS

| | | |
|---|---|---|
| EP | 0 412 187 A1 | 2/1991 |
| JP | 61002522 A | 1/1986 |
| JP | 02-063715 A | 3/1990 |
| JP | 07-094246 B2 | 10/1995 |
| JP | 08-112848 A | 5/1996 |
| JP | 10-337766 A | 12/1998 |
| JP | 2000-176990 A | 6/2000 |
| JP | 3109034 B2 | 9/2000 |
| JP | 2010247345 A | 11/2010 |

OTHER PUBLICATIONS

International Search Report application No. PCT/JP2010/054020 dated Nov. 24, 2011.
International Search Report application No. PCT/JP2010/054020 Jun. 1, 2010.
Notice of Allowance dated Mar. 5, 2013 for corresponding Japanese Patent Application No. 2009-096204.
Office Action dated Mar. 25, 2013 corresponding to Korean Patent Application No. 10-2011-7026108.

* cited by examiner

*Primary Examiner* — Yogendra Gupta
*Assistant Examiner* — Joseph Leyson
(74) *Attorney, Agent, or Firm* — Squire Sanders (US) LLP (57) ABSTRACT

A lip drive part for a T-die that adjusts a gap between first and second lips includes an actuator acts on a flexible lip part forming at least one of the first and second lips of a T-die body, includes a lever that acts on the flexible lip part, a first bellows that narrow the gap by acting on the lever when being expanded, and a second bellows that widen the gap by acting on the lever when being expanded.

15 Claims, 9 Drawing Sheets

LIP DRIVE PART FOR T-DIE

RELATED APPLICATION

This application is based upon and claims the benefit of priority from Japanese Patent Application No. 2009-096208, filed on Apr. 10, 2009, and International Patent Application No. PCT/JP2010/054020, the entire contents of which are incorporated herein by reference.

TECHNICAL FIELD

The present invention relates to a lip drive part for a T-die.

BACKGROUND

There is known a coating thickness control system that performs a laminate process for coating a base material, such as paper, aluminum foil, and plastic, with a resin. A T-die (mold), which controls the flow rate of a resin plasticized and melted by an extruder, is used in this coating thickness control system. A structure disclosed in, for example, PTL 1 is known as a structure that adjusts the flow rate of a molten resin at the T-die by a pneumatic driving method.

A mechanism, which includes an actuator including a lever and a push bolt, is disclosed in PTL 1. The lever is provided on a first T-die body of a T-die body that includes first and second T-die bodies, and bellows are fixed to the upper portion of the lever. The first T-die body includes a flexible lip part at the lower portion thereof, and the second T-die body includes a stationary lip part at the lower portion thereof. The lower portion of the lever is pivotally supported on the first T-die body. The push bolt is provided below a pivot. Further, compressed air is sent to the bellows, the bellows are expanded, the end portion of the push bolt provided below the pivot comes into contact with the flexible lip part, and the lever is rotated in a direction where the flexible lip part is pressed. Accordingly, a gap between the stationary lip part and the flexible lip part is adjusted.

CITATION LIST

Patent Literature

[PTL 1] Japanese Patent No. 3109034

SUMMARY

According to an embodiment of the invention, there is provided a lip drive part for a T-die that adjusts a gap between first and second lips includes an actuator acts on a flexible lip part forming at least one of the first and second lips of a T-die body, includes a lever that acts on the flexible lip part, a first bellows that narrow the gap by acting on the lever when being expanded, and a second bellows that widen the gap by acting on the lever when being expanded.

DETAILED DESCRIPTION

Here, the mechanism disclosed in PTL 1 can perform the fine adjustment of pressure by controlling the compressed air sent to the bellows when narrowing the gap. When widening the gap between the lip parts, the mechanism contracts the bellows by releasing the compressed air of the bellows or decreasing a pressure value. However, it is difficult to perform the fine adjustment of the release of the compressed air or the decrease of the pressure value. For this reason, there is a possibility that it may not be possible to sufficiently cope with a case where more accurate control of the flow rate of a molten resin is required.

It is desirable to provide a lip drive part for a T-die that can adjust a gap between lips with higher accuracy.

In the lip drive part for a T-die, the lever acts on the flexible lip part by the expansion of the first bellows. Accordingly, the gap is narrowed. Further, in the lip drive part for a T-die, the lever acts on the flexible lip part by the expansion of the second bellows. Accordingly, the gap is widened. As described above, in the lip drive part for a T-die according to the invention, the gap between the first and second lips can be narrowed or widened by the expansion of the first and second bellows. Accordingly, as compared to a case where the bellows are contracted by releasing the compressed air supplied to the bellows or decreasing the pressure value of the compressed air as in the related art, the gap between the lips can be adjusted with higher accuracy and the reproducibility of the gap between the lips (the amount of deformation of the flexible lip part) can be increased.

Here, as a structure that effectively obtains the above-mentioned effect, there may be provided, specifically, a structure where the lever acts on the flexible lip part by the rotation thereof, the first bellows are expanded so as to narrow the gap by rotating the lever in a direction where the flexible lip part is pressed, and the second bellows are expanded so as to widen the gap by rotating the lever in a direction opposite to the direction.

Further, as another structure that effectively obtains the above-mentioned effect, there may be provided, specifically, a structure where the first bellows are provided on one surface of the lever and the second bellows are provided on the back surface of the lever opposite to the first bellows.

Furthermore, in the lip drive part for a T-die, a plurality of the first bellows and a plurality of second bellows may be provided along a longitudinal direction of the lever.

Since the plurality of the first bellows and the plurality of second bellows are provided along the longitudinal direction of the lever as described above, the pressure-receiving areas of the first and second bellows relative to the lever are widened. Therefore, the lever can be rotated by a small amount of compressed air or low-pressure compressed air.

Moreover, a distance between a rotating shaft of the lever and a position of the center of gravity of a group of the first bellows may correspond to a distance between the rotating shaft of the lever and a position of the center of gravity of a group of the second bellows.

Since the distance between the rotating shaft of the lever and the position of the center of gravity of the group of the first bellows corresponds to the distance between the rotating shaft of the lever and the position of the center of gravity of the group of the second bellows as described above, a load transmitted to the flexible lip part when compressed air is supplied to the group of the first bellows may be equal to a load transmitted to the flexible lip part when the same amount of compressed air or compressed air having the same pressure value is supplied to the group of the second bellows. Accordingly, the fine adjustment of the driving of the flexible lip part can be easily performed, and the adjustment of the gap between the lips can be performed with high accuracy.

Further, it is preferable that a plurality of the actuators be disposed parallel to each other at the flexible lip part.

Since the plurality of actuators acting on the flexible lip part are disposed parallel to each other as described above, the amount or pressure value of compressed air to be supplied to the bellows of each actuator can be arbitrarily set and the gap between the lips at each actuator can be adjusted with high accuracy. Accordingly, the adjustment of the gap between the lips in the direction where the flexible lip part extends can be performed with higher accuracy.

Here, the disposition of the group of the first bellows and the disposition of the group of the second bellows may be reversed in relation to each other at the adjacent actuators.

Since the disposition of the group of the first bellows and the disposition of the group of the second bellows are reversed in relation to each other at the adjacent actuators as described above, the disposition of the group of the first bellows and the disposition of the group of the second bellows become symmetrical to each other at the adjacent actuators. Accordingly, the loads transmitted to the flexible lip part at the adjacent actuators can be set to the same load on the basis of the amount or pressure values of compressed air to be supplied to the respective groups of the bellows, and the adjustment of the gap between the lips can be performed with higher accuracy.

Here, the dispositions of the first bellows may be deviated from each other in a longitudinal direction of the lever and the dispositions of the second bellows may be deviated from each other in the longitudinal direction of the lever at the adjacent actuators.

Since the dispositions of the first and second bellows are deviated from each other in the longitudinal direction of the lever at the adjacent actuators as in the above-mentioned structure, the pressure-receiving area is increased by disposing, for example, the first and second bellows that have a diameter larger than the width of the lever. Accordingly, a load transmitted to the flexible lip part can be increased. For this reason, the fluctuation range of the gap between the lips can be increased, so that the deviation of the flow rate of a resin can be increased. Further, since the dispositions of the first and second bellows are deviated from each other as described above, the adjacent actuators can be disposed close to each other and the adjustment of the gap along the direction where the flexible lip part extends (the direction where the actuators are disposed parallel to each other) can be more finely performed with high accuracy.

Furthermore, the outer diameter of each of the first and second bellows may be larger than the width of the lever.

The outer diameter of each of the first and second bellows is larger than the width of the lever as described above, so that an area is increased and a pressure-receiving area is increased. Accordingly, the lever of the actuator can be rotated by a small amount of compressed air or low-pressure compressed air. Therefore, a load transmitted to the flexible lip part can be increased.

Here, as a structure that more effectively obtains the above-mentioned effect, there may be provided, specifically, an aspect where the outer diameter of each of the bellows is larger than a pitch between the adjacent actuators.

Moreover, the lever may include concave portions that are to avoid the interference between the first and second bellows of one lever and another adjacent lever at the adjacent actuators.

Due to the concave portions formed at the lever as described above, it is possible to avoid the interference between the lever and the first or second bellows provided in the adjacent actuators and to prevent the rotation of the lever from being hindered.

Further, the lever may press and pull the flexible lip part by the rotation thereof.

Due to the above-mentioned structure, the lever is rotated by the first or second bellows and the flexible lip part is pressed/pulled by the rotation of the lever. Accordingly, the gap between the lips can be controlled with high accuracy even when the gap between the lips is increased.

Furthermore, as a structure that effectively obtains the above-mentioned effect, there may be provided, specifically, an aspect where the lever includes a press part pressing the flexible lip part and a pull part pulling the flexible lip part, the pull part is formed in the shape of a hook, and an end portion of the pull part pulls the flexible lip part.

Moreover, the end portion may be allowed to slide on one surface of the flexible lip part.

Since the end portion of the pull part pulling the flexible lip part is allowed to slide on one surface of the flexible lip part as described above and the end portion pulls the flexible lip part while sliding, the generation of stress except for pulling at the pull part can be suppressed and the adjustment of the gap between the lips can be performed with higher accuracy.

Further, the first bellows may be provided on one surface of the lever and rotate the lever in a direction where the flexible lip part is pressed, and the second bellows may be provided on the back surface of the lever and rotate the lever in a direction opposite to the direction.

As described above, the second bellows, which rotates the lever in the direction opposite to the direction where the flexible lip part is pressed, are provided on the back surface of the lever on which the first bellows are provided. Accordingly, it is possible to accurately control the rotation of the lever in the direction where the flexible lip part is pulled.

An embodiment of the invention will be described in detail below with reference to the accompanying drawings. Meanwhile, in the description of the drawings, the same elements are denoted by the same reference numerals and the repeated description thereof will be omitted.

Figure 1:
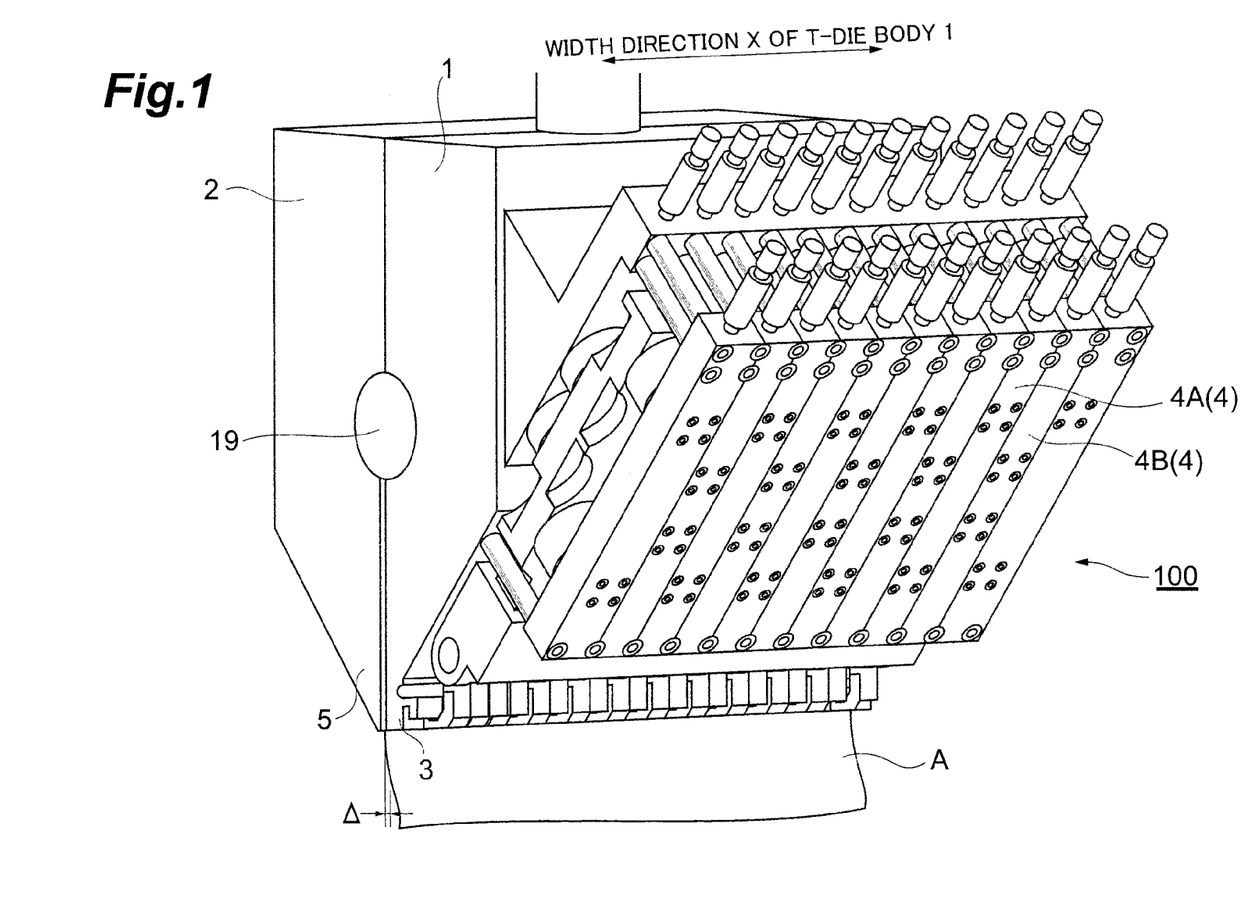
FIG. 1 is a perspective view of a T-die on which a lip drive part for a T-die according to an embodiment is mounted.
Figure 2:
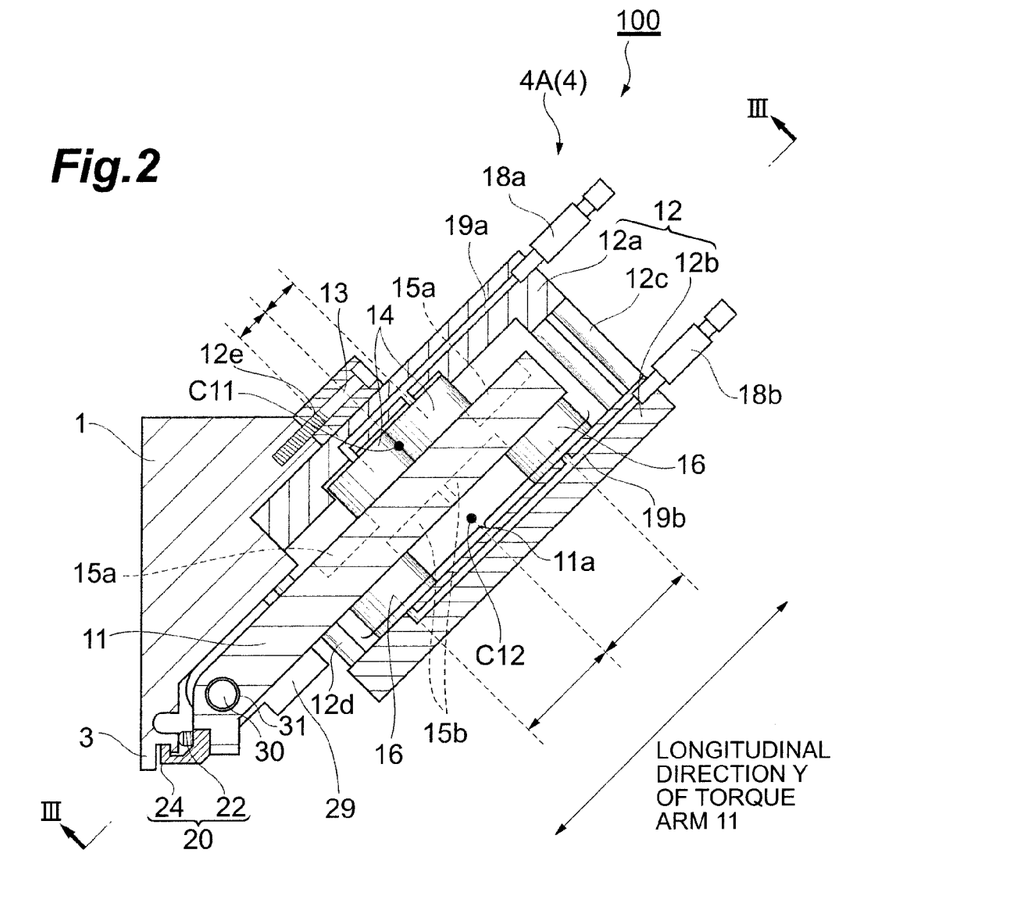
FIG. 2 is an enlarged cross-sectional view of the structure of an actuator of the lip drive part for a T-die shown in FIG. 1.
Figure 3:
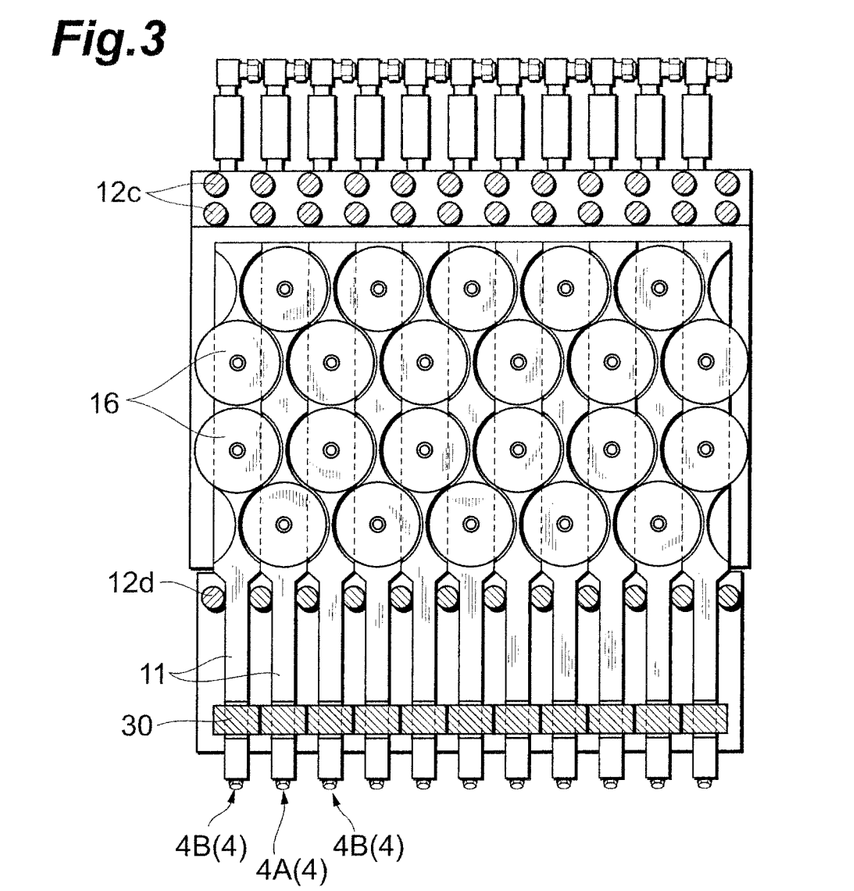
FIG. 3 is a cross-sectional view taken along a line of FIG. 2.
Figure 4:
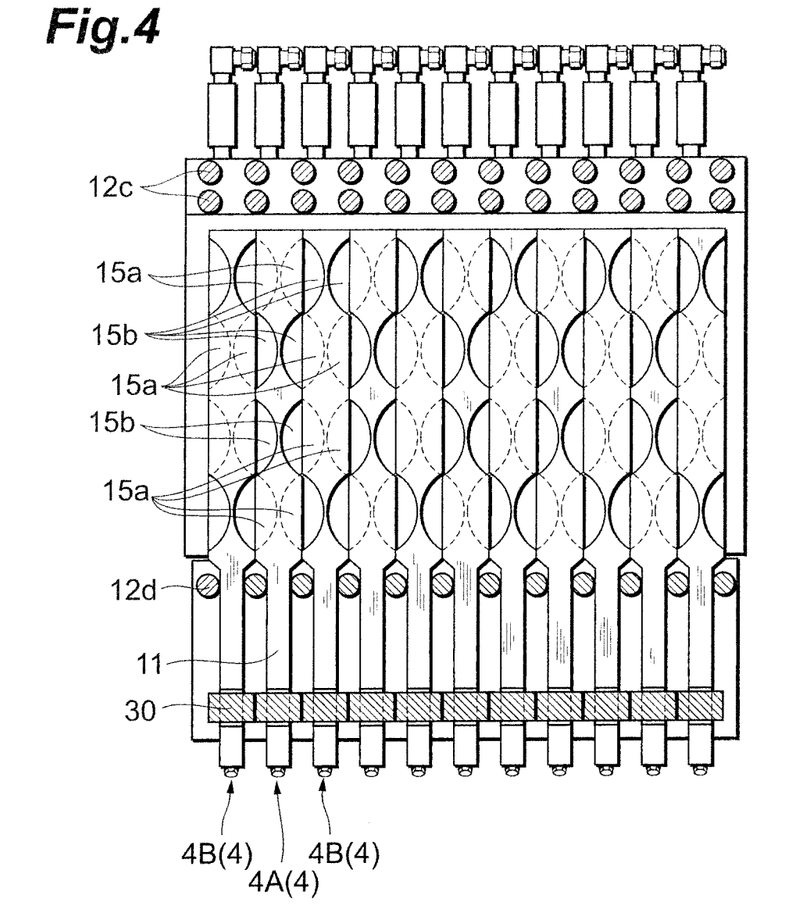
FIG. 4 is a view showing the shape of a torque arm.
Figure 5:
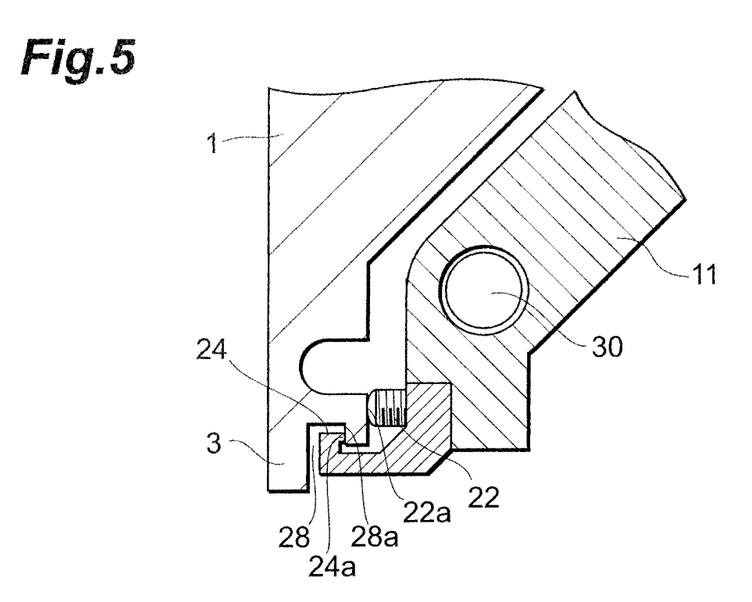
FIG. 5 is a cross-sectional view showing a transmission part of the actuator.
Figure 6:
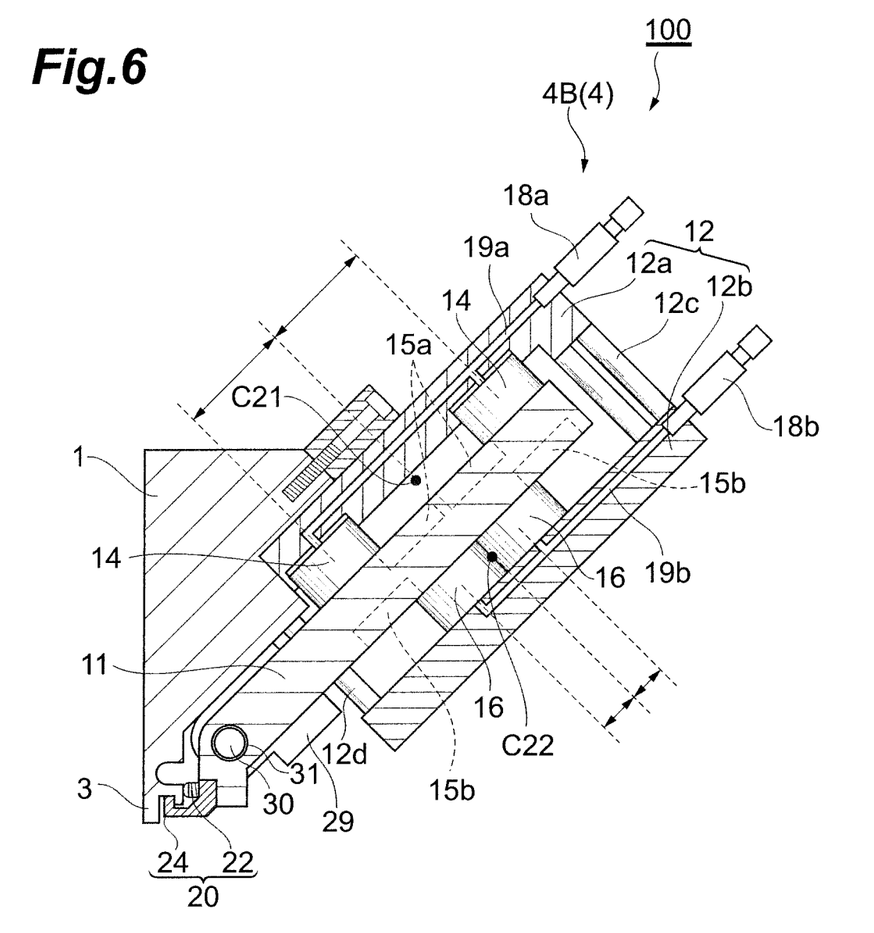
FIG. 6 is a cross-sectional view illustrating another structure of the actuator.
Figure 7:
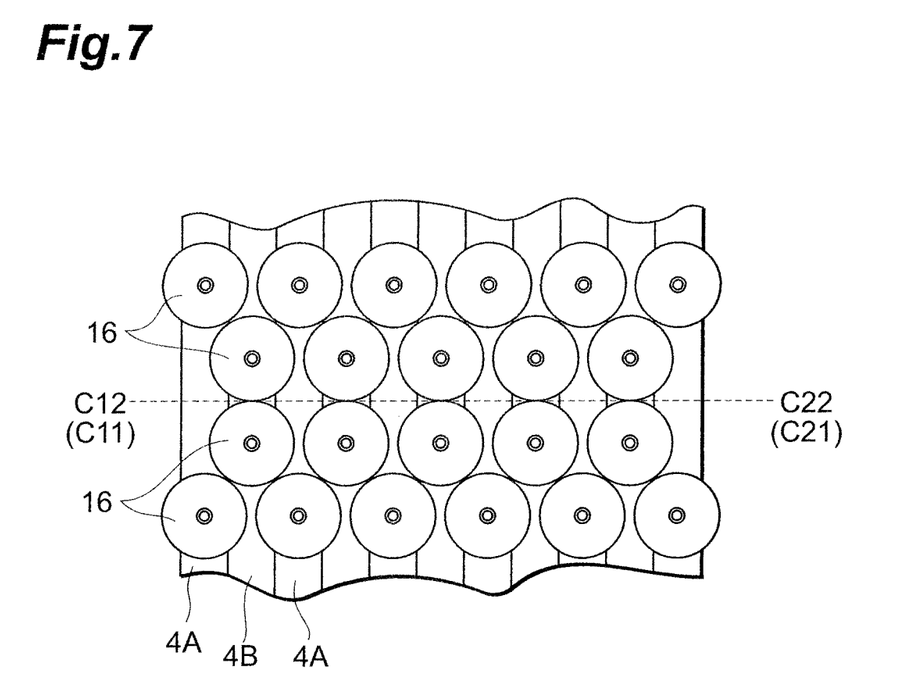
FIG. 7 is a view illustrating the disposition of bellows on a torque arm.

FIG. 1 is a perspective view of a T-die on which a lip drive part for a T-die according to an embodiment is mounted, FIG. 2 is an enlarged cross-sectional view of the structure of an actuator of the lip drive part for a T-die shown in FIG. 1, FIG. 3 is a cross-sectional view taken along a line of FIG. 2, FIG. 4 is a view showing the shape of a torque arm, FIG. 5 is a cross-sectional view showing a transmission part of the actuator, FIG. 6 is a cross-sectional view illustrating another structure of the actuator, and FIG. 7 is a view illustrating the disposition of bellows on a torque arm. A T-die according to this embodiment is a device that is used in an extrusion laminating apparatus, an extrusion film manufacturing apparatus, an extrusion die coater, or the like.

As shown in FIG. 1, the T-die includes a T-die body 1 and a T-die body 2. A flexible lip part (first lip) 3, which extends in a width direction (which is a longitudinal direction in FIG. 1 and is a direction indicated by an arrow X) is formed at the lower end portion of the T-die body 1. A stationary lip (second lip) 5, which extends in the width direction (the longitudinal direction in FIG. 1) and faces the flexible lip part 3, is formed at lower end portion of the T-die body 2. Further, the T-die body 1 is provided with a lip drive part 100 for a T-die that adjusts a gap between the stationary lip 5 and the flexible lip part 3 by deforming the flexible lip part 3. The lip drive part 100 for a T-die is provided with actuators 4.

In the T-die, a molten resin introduced from the upper portions of the T-die bodies 1 and 2 is temporarily made to stay in a manifold 19, which is provided between the T-die bodies 1 and 2, and is spread in the width direction (the longitudinal direction in FIG. 1), so that a resin film A having a predetermined thickness is formed from the gap Δ between the stationary lip 5 and the flexible lip part 3. The thickness of the resin film A is determined by the amount of the molten resin flowing out of the gap Δ between the stationary lip 5 and the flexible lip part 3, and the size of the gap Δ is adjusted by the deformation of the flexible lip part 3 that is performed by the actuators 4 of the lip drive part 100 for a T-die. The T-die body 1 is divided into a plurality of zones along the width direction of the T-die body 1, and the actuators 4 are arranged in the zones, respectively, so as to be parallel to each other. Further, the respective actuators 4 individually deform the flexible lip part 3 extending in the width direction, and the gap Δ between the flexible lip part 3 and the stationary lip 5 is adjusted by each of the actuators 4.

Next, the actuators 4 will be described. Two kinds of actuators 4 (4A and 4B) are alternately mounted on the T-die body 1 according to this embodiment in the width direction so as to be parallel to each other. In the following description, an actuator 4A, which is one structure of the actuator 4, will be described and an actuator 4B having another structure will be described below.

As shown in FIGS. 2 and 3, each of the actuators 4A includes a housing 12 that is provided on the T-die body 1 and includes a base plate 12a and back-up plate 12b; a torque arm (lever) 11 that is disposed between the base plate 12a and the back-up plate 12b, is mounted on the T-die body 1 by an arm support 29 through a shaft 30 corresponding to a rotation axis, and can act on the flexible lip part 3 by being rotated; a transmission part 20 that is provided at the torque arm 11 and can push/pull the flexible lip part 3 by the rotation of the torque arm 11; push-side bellows (first bellows) 14 that are provided on the side, which faces the T-die body 1, (one side of the torque arm 11) of an action portion 11a, which is a portion of the torque arm 11 opposite to the transmission part 20 with respect to the shaft 30, have a circular cross-section, and narrow the gap Δ by acting on the torque arm 11; and pull-side bellows (second bellows) 16 that are provided on the side of the action portion 11a opposite to the T-die body 1 (the back side of the torque arm 11), have a circular cross-section, and widen the gap Δ by acting on the torque arm 11.

The shaft 30 is mounted on the T-die body 1 with a bush 31 interposed therebetween. Due to this structure, a lower portion of the torque arm 11 is supported by the shaft 30 and rotated.

The upper portion of the base plate 12a, which is disposed close to the T-die body 1 and formed in the shape of a substantially flat plate, is connected to the upper portion of the back-up plate 12b, which is separated from the base plate so as to face the base plate and formed in the shape of a substantially flat plate, by connection posts 12c. Accordingly, the housing 12 provided around the torque arm 11 is formed. Further, the base plate 12a of the housing 12 is fixed to the T-die body 1 by a bolt 13, which is mounted on a support block 12e provided on the surface of the base plate 12a opposite to the torque arm 11. Furthermore, the back-up plate 12b is fixed to the T-die body 1 by a connection post 12d, which is provided at the lower portion of the back-up plate 12b, so that the torque arm 11 is disposed inside the back-up plate. The base plate 12a and the back-up plate 12b are mounted on the T-die body 1 so as to be closed at the upper and lower positions. Moreover, the arm support 29, which is disposed along the longitudinal direction of the T-die body 1, covers the lower portion of the torque arm 11 and the shaft 30 and is provided to mount the torque arm 11 on the T-die body 1.

A plurality of push-side bellows 14 are mounted on the torque arm 11 and the base plate 12a along the longitudinal direction of the torque arm 11 (a direction indicated by an arrow Y of FIG. 2). Further, compressed air is sent to the push-side bellows 14 through a joint 18a provided at the upper portion of the base plate 12a and an air pipe 19a provided in the base plate 12a, so that the push-side bellows 14 are expanded. Furthermore, when the compressed air, which is sent to the push-side bellows 14, is released to the outside through the air pipe 19a or the pressure value of the compressed air is decreased, the push-side bellows 14 contract.

Meanwhile, a plurality of pull-side bellows 16 are mounted on the torque arm 11 and the back-up plate 12b along the longitudinal direction of the torque arm 11. Further, compressed air is sent to the pull-side bellows 16 through a joint 18b provided at the upper portion of the back-up plate 12b and an air pipe 19b provided in the back-up plate 12b, so that the pull-side bellows 16 are expanded. Furthermore, when the compressed air, which is sent to the pull-side bellows 16, is released to the outside through the air pipe 19b or the pressure value of the compressed air is decreased, the pull-side bellows 16 contract.

In the actuator 4A, the push-side bellows 14 and the pull-side bellows 16 mounted on the torque arm 11 are disposed in the longitudinal direction of the torque arm 11 in the manners different from each other. Specifically, in this embodiment, two push-side bellows are disposed on each side, the push-side bellows 14 are disposed in the middle portion of the torque arm 11, and the pull-side bellows 16 are disposed at both end portions of the torque arm 11. That is, the push-side bellows 14 are disposed adjacent to each other with a position C11 of the center of gravity of a group of the push-side bellows 14, and the pull-side bellows 16 are disposed so as to be separated from each other with a position C12 of the center of gravity of a group of the pull-side bellows 16 interposed therebetween. Further, the push-side bellows 14 and the pull-side bellows 16 are disposed so that a distance between the shaft 30 and the position C11 of the center of gravity of the group of the push-side bellows 14 corresponds to a distance between the shaft 30 and the position C12 of the center of gravity of the group of the pull-side bellows 16 in the longitudinal direction of the torque arm 11.

As shown in FIG. 5, the transmission part 20 includes a push bolt (press part) 22 that is mounted below the shaft 30 of the torque arm 11, and a pull part (pull rod) 24 that is formed closer to the flexible lip part 3 than the push bolt 22.

The push bolt 22 is mounted on the torque arm 11 at a position where the push bolt can face and press the flexible lip part 3 of the T-die body 1. An end portion 22a of the push bolt 22 is formed in a spherical shape, and comes into point contact with the flexible lip part 3.

Meanwhile, a concave portion 28 is formed at the bottom of the T-die body 1 at the flexible lip part 3. Further, the pull part 24 mounted on the torque arm 11 is formed in the shape of a hook, and is disposed in the concave portion 28 that is formed at the flexible lip part 3. An end portion (pressing surface) 24a of the pull part comes into contact with one surface (the surface close to the push bolt 22) 28a of the concave portion 28. Further, the end portion 24a is, for example, polished so as to be allowed to slide on one surface 28a of the concave portion 28. When the end portion 24a does not slide, a downward force in FIG. 5, that is, a force for reducing the gap Δ between the lips is generated on the contact surface between the pull part and the one surface 28a of the concave portion 28. However, since the end portion 24a is allowed to slide, it is possible to reduce a force, which is generated on the contact surface, in other directions other than the direction where the flexible lip part 3 is pulled (a downward force in FIG. 5).

Here, when the push-side bellows 14 are expanded by sending compressed air to the push-side bellows 14 while the pull-side bellows 16 of the torque arm 11 are released or the pressure value of the compressed air is decreased, the torque arm 11 is rotated in a direction where the end portion 22a of the push bolt 22 comes into contact with and presses the flexible lip part 3 (clockwise in FIG. 2).

Meanwhile, when the pull-side bellows 16 are expanded by sending compressed air to the pull-side bellows 16 while the push-side bellows 14 of the torque arm 11 are released or the pressure value of the compressed air is decreased, the torque arm 11 is rotated in a direction where the end portion 24a of the pull part 24 comes into contact with and presses one surface 28a of the concave portion 28 of the flexible lip part 3 (counterclockwise in FIG. 2).

As described above, in the actuator 4 (4A) according to this embodiment, the torque arm 11 is rotated by the expansion of the push-side bellows 14 or the pull-side bellows 16, so that the transmission part 20 presses/pulls the flexible lip part 3. Accordingly, the size of the gap Δ between the flexible lip part 3 and the stationary lip 5 can be adjusted.

FIG. 6 is a cross-sectional view illustrating the structure of the actuator 4B that is adjacent to the actuator 4A. The actuator 4B is different from the actuator 4A in terms of the dispositions of the push-side bellows 14 and the pull-side bellows 16. Specifically, the push-side bellows 14 are disposed at end portions of the torque arm 11, and the pull-side bellows 16 are disposed in the middle portion of the torque arm 11. That is, the push-side bellows 14 are provided at positions that are separated from a position C21 of the center of gravity of a group of the push-side bellows 14, and the pull-side bellows 16 are provided at positions that are adjacent to a position C22 of the center of gravity of a group of the pull-side bellows 16. Further, the push-side bellows 14 and the pull-side bellows 16 are disposed so that a distance between the shaft 30 and the position C21 of the center of gravity of the group of the push-side bellows 14 corresponds to a distance between the shaft 30 and the position C22 of the center of gravity of the group of the pull-side bellows 16 in the longitudinal direction of the torque arm 11. The correspondence between the positions of the center of gravity is the same as that of the actuator 4A. Further, as shown in FIG. 7, the distance between the shaft 30 and the position C11 of the center of gravity corresponds to the distance between the shaft 30 and the position C21 of the center of gravity in the longitudinal direction of the torque arm 11, and the distance between the shaft 30 and the position C12 of the center of gravity corresponds to the distance between the shaft 30 and the position C22 of the center of gravity in the longitudinal direction of the torque arm 11.

The actuators 4A and 4B are alternately disposed along the flexible lip part 3 in the width direction of the T-die body 1 so as to be parallel to each other. That is, the lip drive part 100 for a T-die shown in this embodiment has a structure where the dispositions of the push-side bellows 14 are deviated from each other in the longitudinal direction of the torque arm 11 and the dispositions of the pull-side bellows 16 are deviated from each other in the longitudinal direction of the torque arm 11 at the adjacent actuators.

Moreover, as shown in FIG. 3, the diameter of each of the push-side bellows 14 and the pull-side bellows 16, which are provided on the torque arms 11 of the actuators 4 (4A and 4B), is larger than a pitch where the actuators 4 (4A and 4B) are disposed parallel to each other and the width of the torque arm 11. When the actuators 4A and 4B are disposed close to each other, there is a possibility that the push-side bellows 14 and the pull-side bellows 16 may interfere with adjacent torque arms 11. When the rotation angles of the adjacent torque arms 11 are different from each other (when the gaps Δ are different from each other) at the adjacent torque arms 11, there is a concern that the torque arms may interfere with each other (during the rotation) in a direction where the bellows are expanded. Therefore, concave portions 15a, which are to avoid the interference between the torque arm and the push-side bellows 14 of the adjacent actuators 4, and concave portions 15b, which are to avoid the interference between the torque arm and the pull-side bellows 16, are formed at the torque arm 11 of the actuator 4.

Since the push-side bellows 14 are expanded and act on the torque arm 11 in the lip drive part 100 for a T-die according to this embodiment as described above, the gap Δ between the lips is narrowed. That is, the torque arm 11 is rotated about the shaft 30, which corresponds to a rotation axis, as a fulcrum by the expansion of the push-side bellows 14, and the flexible lip part 3 is pressed by the end portion 22a of the push bolt 22 of the transmission part 20. Accordingly, the flexible lip part 3 is deformed in a direction where the flexible lip part approaches the stationary lip 5, so that the gap Δ between the lips is narrowed. Further, the pull-side bellows 16 are expanded and act on the torque arm 11, so that the gap Δ between the lips is widened. That is, the torque arm 11 is rotated about the shaft 30 as a fulcrum by the expansion of the pull-side bellows 16 and the end portion 24a of the pull part 24 of the transmission part 20 presses one surface 28a of the concave portion 28 formed at the flexible lip part 3, so that the flexible lip part 3 is pulled. Accordingly, the flexible lip part 3 is deformed in a direction where the flexible lip part is separated from the stationary lip 5, so that the gap Δ between the lips is widened.

Since the push-side bellows (first bellows) 14 and the pull-side bellows (second bellows) 16 are provided in the lip drive part 100 for a T-die according to this embodiment as described above, the gap Δ between the lips can be narrowed or widened. Accordingly, as compared to a case where the push-side bellows are contracted by releasing compressed air supplied to the push-side bellows or decreasing the pressure value of the compressed air as in the related art, the reproducibility of the gap Δ between the lips (the amount of deformation of the flexible lip part) can be increased and the gap Δ between the lips can be adjusted with higher accuracy.

Moreover, since the plurality of push-side bellows 14 and the plurality of pull-side bellows 16 are provided in the longitudinal direction of the torque arm 11 in the lip drive part 100 for a T-die, the pressure-receiving areas of the push-side bellows 14 and the pull-side bellows 16 relative to the torque arm 11 are widened. Therefore, the torque arm 11 can be rotated by a small amount of compressed air or low-pressure compressed air. Further, since the distances between the shaft 30 and the positions C11 and C21 of the center of gravity of the group of the push-side bellows 14 correspond to the distances between the shaft 30 and the positions C12 and C22 of the center of gravity of the group of the pull-side bellows 16 in the longitudinal direction of the torque arm 11, a load transmitted to the flexible lip part 3 when compressed air is supplied to the group of the push-side bellows 14 is equal to a load transmitted to the flexible lip part 3 when the same amount of compressed air is supplied to the group of the pull-side bellows 16. Accordingly, the amount or pressure value of compressed air to be supplied does not need to be compensated on one side of the push-side and pull-side, and the fine adjustment of the driving of the flexible lip part 3 can be easily performed.

Further, since a plurality of actuators 4, which deform the flexible lip part 3, are disposed parallel to each other in the lip drive part 100 for a T-die, the position of the flexible lip part 3 can be accurately adjusted for each actuator 4 and the adjustment of the gap Δ between the flexible lip part 3 and the stationary lip 5 in a direction where the flexible lip part 3 extends (the width direction of a resin A) can be performed with higher accuracy.

Furthermore, the lip drive part 100 for a T-die has a structure where the distances between the shaft 30 and the positions (C11 and C21) of the center of gravity of the group of the push-side bellows 14 in the longitudinal direction of the torque arm 11 correspond to the distances between the shaft 30 and the positions (C12 and C22) of the center of gravity of the group of the pull-side bellows 16 in the longitudinal direction of the torque arm 11 at the adjacent actuators 4. Accordingly, when the same amount of compressed air or compressed air having the same pressure value is sent to the group of the push-side bellows 14 or the group of the pull-side bellows 16 of the adjacent actuators 4, the loads transmitted to the flexible lip part 3 by the respective actuators 4 can become equal to each other. For this reason, the amount or pressure value of compressed air to be supplied does not need to be compensated for each of the adjacent actuators 4, and the fine adjustment of the deformation of the flexible lip part 3 can be easily performed.

Further, in the lip drive part 100 for a T-die, the dispositions of the groups of the push-side bellows 14 and the dispositions of the groups of the pull-side bellows 16 are reversed in relation to each other and become symmetrical to each other, respectively, at the adjacent actuators 4 (4A and 4B). Accordingly, since the loads transmitted to the flexible lip part at the adjacent actuators 4 can be set to the same load on the basis of the amount or pressure values of compressed air to be supplied to the respective groups of the bellows, the fine adjustment of the flexible lip part 3 can be easily performed.

Furthermore, in the lip drive part 100 for a T-die, the dispositions of the push-side bellows 14 and the pull-side bellows 16 in the longitudinal direction of the torque arm 11 are deviated from each other at the adjacent actuators 4 among the plurality of actuators 4 that are disposed parallel to each other at the flexible lip part 3 so as to individually adjust the gap Δ along the direction where the flexible lip part 3 extends. Accordingly, while the adjacent actuators 4 are disposed close to each other in a direction where the actuators 4 are disposed parallel to each other, the bellows having a diameter larger than the width of the torque arm 11 can be disposed. Moreover, since the adjacent actuators 4 are disposed close to each other without the interference between the bellows 14 and the interference between the bellows 16, the adjustment of the gap Δ between the lips in the direction where the flexible lip part 3 extends (the width direction of a resin A) can be performed with higher accuracy.

Further, the outer diameter of each of the bellows 14 and 16 of the torque arm 11 is larger than the pitch between the adjacent actuators 4 (4A and 4B) and the width of the torque arm 11. Since the area of the bellows is large as described above, a force applied to the torque arm 11 can be increased even though the amount of compressed air is small or the pressure value of compressed air is small. Accordingly, a load transmitted to the flexible lip part 3 can be increased and the fluctuation range of the gap Δ between the lips can be increased by the deflection of the flexible lip part 3 in a direction where the flexible lip part is pressed. As a result, the deviation of the flow rate of a resin can be increased.

Furthermore, the torque arm 11 includes the concave portions 15a and 15b that are to avoid the interference between the bellows 14 and 16 of one torque arm 11 and another adjacent torque arm 11 at the adjacent actuators 4. Due to the concave portions 15a and 15b, it is possible to avoid the interference between the torque arm 11 and the bellows 14 and 16 provided in the adjacent actuators 4 and to prevent the rotation of the torque arm 11 from being hindered.

Moreover, in the lip drive part 100 for a T-die according to this embodiment, the torque arm 11 is rotated by the push-side bellows 14 and the pull-side bellows 16 and the flexible lip part 3 is pressed/pushed by the rotation of the torque arm 11. Accordingly, the gap Δ between the lips can be controlled with high accuracy even when the gap Δ between the lips is increased. That is, since the transmission part 20 including the pull part 24 is provided, the movement of the flexible lip part 3 in a direction where the gap Δ between the lips is widened can be controlled with higher accuracy and the adjustment of the gap Δ between the lips can be performed with higher accuracy.

Further, the pull part 24 of the above-mentioned embodiment is formed in the shape of a hook and the end portion (pressing surface) 24a of the pull part pulls the flexible lip part 3. Specifically, the end portion (pressing surface) 24a of the pull part 24 presses one surface 28a of the concave portion 28 of the flexible lip part 3. Furthermore, the end portion (pressing surface) 24a of the pull part 24, which presses one surface 28a of the concave portion 28, is allowed to slide on the one surface 28a and the pull part 24 pulls the flexible lip part 3 while sliding. Accordingly, the generation of stress except for pulling at the pull part 24 can be suppressed and the adjustment of the gap Δ between the lips can be performed with higher accuracy.

Moreover, when the gap Δ between the lips was adjusted by only a push bolt in the related art, the size of the gap Δ could not be partially increased. However, the pull part 24 is provided in this embodiment. Accordingly, the flexible lip part 3 is deformed by the pull part 24 at a position where the gap Δ is required to be partially widened, so that the gap Δ is increased; and the flexible lip part 3 is deformed around the position by the push bolt 22, so that the gap Δ is narrowed. As a result, the gap Δ can be partially widened. Further, the gap Δ can be partially narrowed in contrast to this.

The invention has been described in detail above with reference to the embodiment. However, the invention is not limited to the above-mentioned embodiment. For example, in the above-mentioned embodiment, the lip drive part 100 for a T-die may be applied to, for example, a die for a coater or a die for solution-cast other than a T-die for extrusion molding. Further, the structure according to the above-mentioned embodiment may be applied to not only a flat die but also a round die for inflation molding and the like.

Furthermore, the structure, which adjusts the gap Δ between the flexible lip part 3 formed at the T-die body 1 and the stationary lip 5 formed at the T-die body 2 by deforming the flexible lip part 3 by the actuators 4 provided at the T-die body 1, has been described in the above-mentioned embodiment. All the lips formed at the T-die bodies 1 and 2 may be formed of a flexible lip and actuators 4 may be provided at both the T-die bodies 1 and 2, so that the size of the gap Δ between the lips can be changed by the deformation of the respective flexible lips formed at the T-die bodies 1 and 2.

Moreover, a case where the cross-section of each of the push-side bellows 14 and the pull-side bellows 16 has a circular shape has been described in the above-mentioned embodiment, but the cross-section of each of the push-side bellows and the pull-side bellows may have a rectangular shape. If the cross-section of each of the push-side bellows and the pull-side bellows has a circular shape, each of the push-side bellows and the pull-side bellows is inexpensive and has a long life. If the cross-section of each of the push-side bellows and the pull-side bellows has a rectangular shape, the area of a portion of each of the push-side bellows and the pull-side bellows coming into contact with the torque arm 11 can be increased. Further, the push-side bellows 14 and the pull-side bellows 16 may be expanded by water, oil, or the like instead of compressed air. Furthermore, the push-side bellows 14 or the pull-side bellows 16 may be contracted by not only sending but also actively sucking compressed air, water, oil, or the like.

Figure 8:
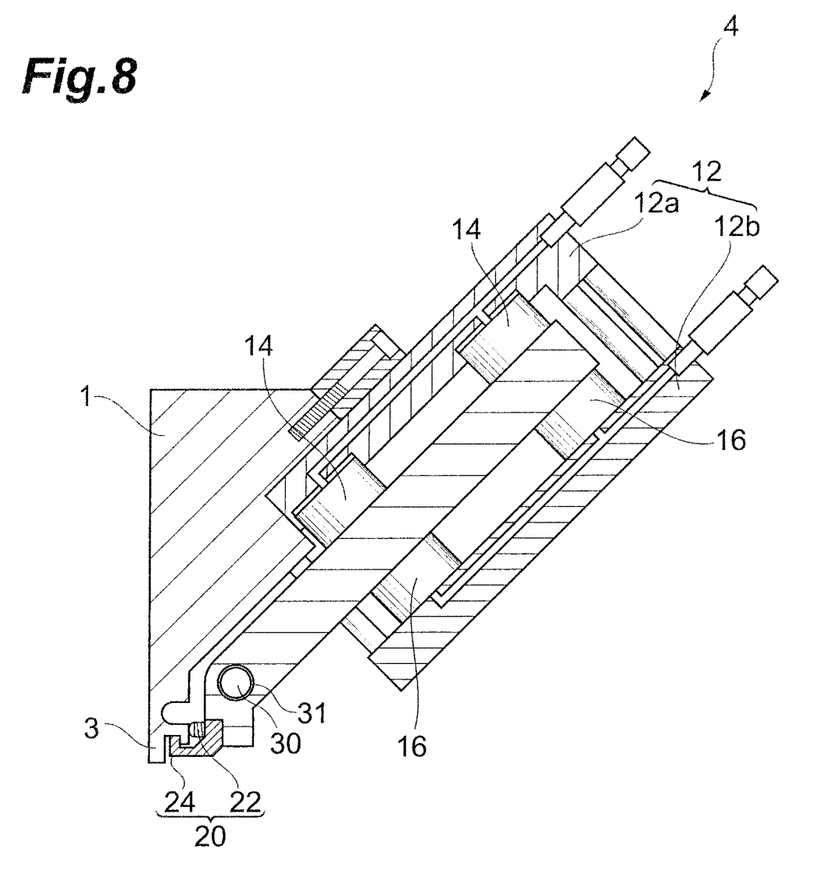
FIG. 8 is a view illustrating another disposition of bellows on a torque arm.
Figure 9:
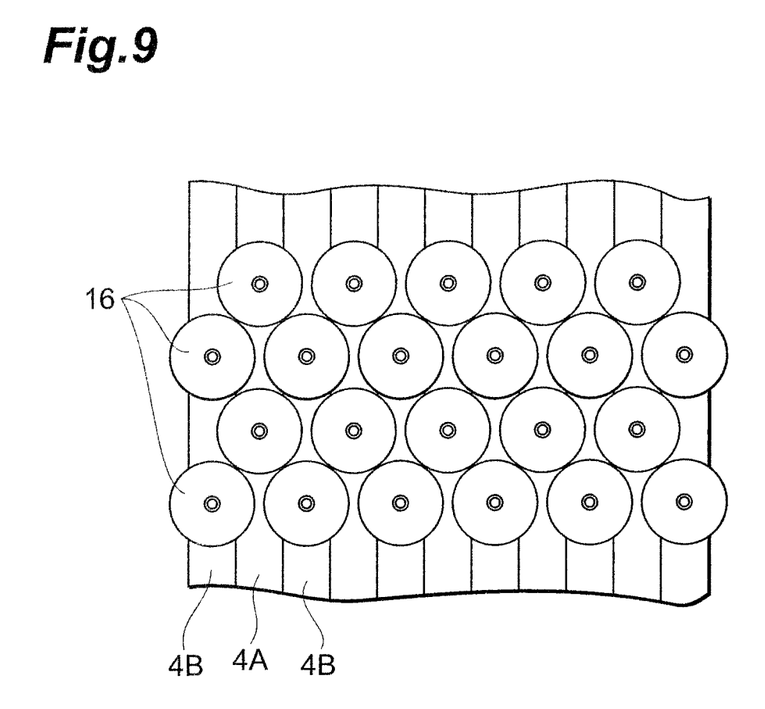
FIG. 9 is a view illustrating still another disposition of bellows on a torque arm.

Moreover, the dispositions of the push-side bellows 14 and the pull-side bellows 16 provided on the torque arm 11 are not limited to the above-mentioned embodiment. For example, as shown in FIG. 8, the group of the push-side bellows 14 and the group of the pull-side bellows 16 may be disposed so as to face each other with the torque arm 11 interposed therebetween. Further, the push-side bellows 14 and the pull-side bellows 16 of the adjacent actuators 4 may also be disposed, for example, in a zigzag pattern as shown in FIG. 9. The dispositions of the push-side bellows 14 and the pull-side bellows 16, which are mounted on the torque arm 11 as described above, may be appropriately changed.

Furthermore, the structure where the diameter of each of the push-side bellows 14 and the pull-side bellows 16 is larger than the pitch between the actuators 4 that are disposed parallel to each other and the width of the torque arm 11 has been described in the above-mentioned embodiment. However, the diameter of each of the push-side bellows 14 and the pull-side bellows 16 may be smaller than the pitch between the actuators 4 that are disposed parallel to each other and may be smaller than the width of the torque arm 11. Since the pull-side bellows 16 are provided even in this case, an effect of the invention of performing the adjustment of the gap Δ between the flexible lip part 3 and the stationary lip 5 with higher accuracy is obtained.

Further, the structure of the transmission part 20, which can press/pull the flexible lip part 3, is not limited to the above-mentioned embodiment. For example, instead of the push bolt 22, the back side of the pull part 24 disposed in the concave portion 28 of the flexible lip part 3 may further include a press part that comes into contact with the surface of the concave portion 28 facing one surface 28a and presses the surface of the concave portion 28 facing one surface 28a toward the stationary lip 5. The push bolt 22 may be screwed into the flexible lip part 3 so as to press and pull the flexible lip part 3. Furthermore, the end portion 24a of the pull part 24 may be formed in a spherical shape.

Moreover, the structure where the concave portion 28 is formed at the T-die body 1 and the pull part 24 presses one surface 28a of the concave portion 28 has been described in the above-mentioned embodiment, but the invention is not limited thereto. That is, the concave portion 28 is not essential, and a surface, which makes the flexible lip part 3 be movable by being pressed by at least the pull part 24, may be formed. As this structure, there is, for example, a structure where a convex portion is formed at the T-die body 1 and the flexible lip part 3 is deformed in a direction where the flexible lip part is separated from the stationary lip 5 when the pull part 24 presses one surface of the convex portion.

REFERENCE SIGNS LIST 1, 2: T-DIE BODY
3: FLEXIBLE LIP PART (FIRST LIP)
(4A, 4B): ACTUATOR
5: STATIONARY LIP (SECOND LIP)
11: TORQUE ARM (LEVER)
11A: ACTION PORTION
12: HOUSING
14: PUSH-SIDE BELLOWS (FIRST BELLOWS)
16: PULL-SIDE BELLOWS (SECOND BELLOWS)
20: TRANSMISSION PART
22: PUSH BOLT (PRESS PART)
24: PULL PART (PULL ROD)
100: LIP DRIVE PART FOR T-DIE

The invention claimed is:

1. A lip drive part for a T-die that adjusts a gap between first and second lips comprising:
an actuator acts on a flexible lip part forming at least one of the first and second lips of a T-die body, includes;
a lever that acts on the flexible lip part,
a first bellows that narrow the gap by acting on the lever when being expanded, and
a second bellows that widen the gap by acting on the lever when being expanded.

2. The lip drive part for a T-die according to claim 1, wherein the lever acts on the flexible lip part by the rotation thereof,
the first bellows are expanded so as to narrow the gap by rotating the lever in a direction where the flexible lip part is pressed, and
the second bellows are expanded so as to widen the gap by rotating the lever in a direction opposite to the direction.

3. The lip drive part for a T-die according to claim 1, wherein the first bellows are provided on one surface of the lever, and
the second bellows are provided on the back surface of the lever.

4. The lip drive part for a T-die according to claim 1, wherein a plurality of the first bellows and a plurality of second bellows are provided along a longitudinal direction of the lever.

5. The lip drive part for a T-die according to claim 4, wherein a distance between a rotating shaft of the lever and a position of the center of gravity of a group of the first bellows corresponds to a distance between the rotating shaft of the lever and a position of the center of gravity of a group of the second bellows.

6. The lip drive part for a T-die according to claim 4, wherein a plurality of the actuators are disposed parallel to each other at the flexible lip part.

7. The lip drive part for a T-die according to claim 6, wherein the disposition of the group of the first bellows and the disposition of the group of the second bellows are reversed in relation to each other at the adjacent actuators.

8. The lip drive part for a T-die according to claim 6, wherein the dispositions of the first bellows are deviated from each other in a longitudinal direction of the lever and the dispositions of the second bellows are deviated from each other in the longitudinal direction of the lever at the adjacent actuators.

9. The lip drive part for a T-die according to claim 8, wherein the outer diameter of each of the first and second bellows is larger than the width of the lever.

10. The lip drive part for a T-die according to claim 9, wherein the outer diameter of each of the first and second bellows is larger than a pitch between the adjacent actuators.

11. The lip drive part for a T-die according to claim 9, wherein the lever includes concave portions that are to avoid the interference between the first and second bellows of one lever and another adjacent lever at the adjacent actuators.

12. The lip drive part for a T-die according to claim 1, wherein the lever presses and pulls the flexible lip part by the rotation thereof.

13. The lip drive part for a T-die according to claim 12, wherein the lever includes a press part that presses the flexible lip part and a pull part that pulls the flexible lip part, and
the pull part is formed in the shape of a hook and an end portion of the pull part pulls the flexible lip part.

14. The lip drive part for a T-die according to claim 13, wherein the end portion is allowed to slide on one surface of the flexible lip part.

15. The lip drive part for a T-die according to claim 12, wherein the first bellows are provided on one surface of the lever, and rotate the lever in a direction where the flexible lip part is pressed, and
the second bellows are provided on the back surface of the lever, and rotate the lever in a direction opposite to the direction.

* * * * *